(12) United States Patent
Cesario et al.

(10) Patent No.: US 8,326,505 B2
(45) Date of Patent: Dec. 4, 2012

(54) SYSTEM AND METHOD FOR SELF-ADAPTIVE CONTROL OF AN ELECTROMECHANICAL BRAKE

(75) Inventors: Nicola Cesario, Casalnuovo di Napoli (IT); Ferdinando Taglialatela Scafati, Giugliano (IT); Olga Scognamiglio, Portici (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 658 days.

(21) Appl. No.: 11/974,915

(22) Filed: Oct. 15, 2007

(65) Prior Publication Data

US 2008/0288147 A1     Nov. 20, 2008

(30) Foreign Application Priority Data

Oct. 13, 2006  (IT) .............................. TO2006A0735

(51) Int. Cl.
    *G06F 7/70*     (2006.01)
(52) U.S. Cl. ................ 701/70; 701/68; 701/71; 701/77; 303/20; 303/121; 303/138; 303/139; 703/2; 703/7
(58) Field of Classification Search .................... 701/70, 701/68, 71, 77; 303/20, 121, 138, 139; 703/2, 703/7
    See application file for complete search history.

(56) References Cited

U.S. PATENT DOCUMENTS

| | | | | |
|---|---|---|---|---|
| 5,424,942 A | * | 6/1995 | Dong et al. ...................... | 700/44 |
| 6,082,834 A | * | 7/2000 | Kolbe et al. .................... | 303/139 |
| 6,127,927 A | * | 10/2000 | Durban et al. ............. | 340/568.5 |
| 6,178,369 B1 | * | 1/2001 | Bohm .............................. | 701/70 |
| 6,285,971 B1 | * | 9/2001 | Shah et al. ....................... | 703/2 |
| 6,966,613 B2 | * | 11/2005 | Davis ................................ | 303/7 |
| 2003/0154012 A1 | * | 8/2003 | Anwar ........................... | 701/71 |
| 2004/0232762 A1 | * | 11/2004 | Maron .......................... | 303/20 |
| 2005/0075846 A1 | * | 4/2005 | Kim ................................ | 703/1 |
| 2008/0288147 A1 | * | 11/2008 | Cesario et al. .................. | 701/70 |

OTHER PUBLICATIONS

Carlos Bordons et al: "A Generalized Predictive Controller for a Wide Class of Industrial Processes"; IEEE Transactions on Control Systems Technology, IEEE Service Center, New York, NY, US, vol. 6, No. 3, May 1998, XP011013889, ISSN: 1063-6536, p. 372-p. 375.
Rawlings J B: " Tutorial: model predictive control technology", American Control Conference, 1999. Proceedings of the 1999 San Diego, CA, USA Jun. 2-4, 1999, Piscataway, NJ, USA, IEEE, US, vol. 1, Jun. 2, 1999, pp. 662-676, XP010345348, ISBN: 0-7803-4990-3, p. 668-p. 676.
European Search Report, European Patent Office, Appl. No. EP 07 11 8423, Jan. 25, 2008 (9 pp).

* cited by examiner

*Primary Examiner* — Redhwan K Mawari
(74) *Attorney, Agent, or Firm* — Graybeal Jackson LLP

(57) ABSTRACT

A control system for an electromechanical-braking system provided with actuator elements configured to actuate braking elements for exerting a braking action has a control stage for controlling the braking action on the basis of a braking reference signal. The control stage comprises a model-based predictive control block, in particular of a generalized predictive self-adaptive control type, operating on the basis of a control quantity representing the braking action. The control system further has: a model-identification stage, which determines parameters identifying a transfer function of the electromechanical-braking system; and a regulation stage, which determines an optimal value of endogenous parameters of the control system on the basis of the value of the identifying parameters.

24 Claims, 6 Drawing Sheets

SYSTEM AND METHOD FOR SELF-ADAPTIVE CONTROL OF AN ELECTROMECHANICAL BRAKE

PRIORITY CLAIM

This application claims priority from Italian patent application No. TO2006A 000735, filed Oct. 13, 2006, which is incorporated herein by reference.

TECHNICAL FIELD

An embodiment of the present invention relates to a system and to a method for controlling an electromechanical brake, in particular for electromechanical braking systems of a BBW (Brake-By-Wire) type.

BACKGROUND

In the last few years so-called "Drive by Wire" systems have been proposed, which envisage the use of electromechanical systems for management and electronic control of the main functions of a vehicle, for example steering, change gear, clutch, and braking system, in place of conventional heavy and bulky mechanical and hydraulic devices. In particular, electromechanical-braking (brake-by-wire) systems have been proposed, using, instead of traditional hydraulic callipers, actuators of an electromechanical type, appropriately driven by an electronic control unit. Brake-by-wire systems offer better housing solutions, eliminating the problems deriving from the hydraulic component, with the further environmental advantage determined by the absence of brake fluid, and also offer a complete active control of the vehicle braking system, being integrated with other on-board electronic devices, such as ABS, EBD, ESP, TCS, etc. For example, in the case of ABS (Antilock Braking System), modulation of braking in the case of wheel-locking can be directly applied to the braking system, without intervening indirectly on the pressure of the hydraulic system, as occurs in conventional systems. Furthermore, more sophisticated and refined control logic can be implemented, for example for partialization of the braking between the various wheels of the vehicle.

A problem linked to the use of an electromechanical-braking system is represented by the difficulty of guaranteeing the safety of the vehicle during driving in order to ensure a level of safety at least comparable to what is currently offered by traditional hydraulic-mechanical systems. In particular, the control strategies of electromechanical-braking systems that have been proposed are not satisfactory, and in particular are not robust against structural changes in the braking systems, due for example to aging, wear, and malfunctioning of corresponding electrical/mechanical components.

SUMMARY

Accordingly, there is a need to improve the control systems of electromechanical-braking systems, in particular as regards the characteristics of precision and accuracy and stability and reliability in the long term.

An embodiment of the present invention meets said need, and may solve, either totally or in part, the problems and disadvantages presented by control systems of a known type.

BRIEF DESCRIPTION OF THE DRAWINGS

One or more embodiments of the present invention are now described, purely by way of non-limiting example and with reference to the attached drawings.

DETAILED DESCRIPTION

Figure 1:
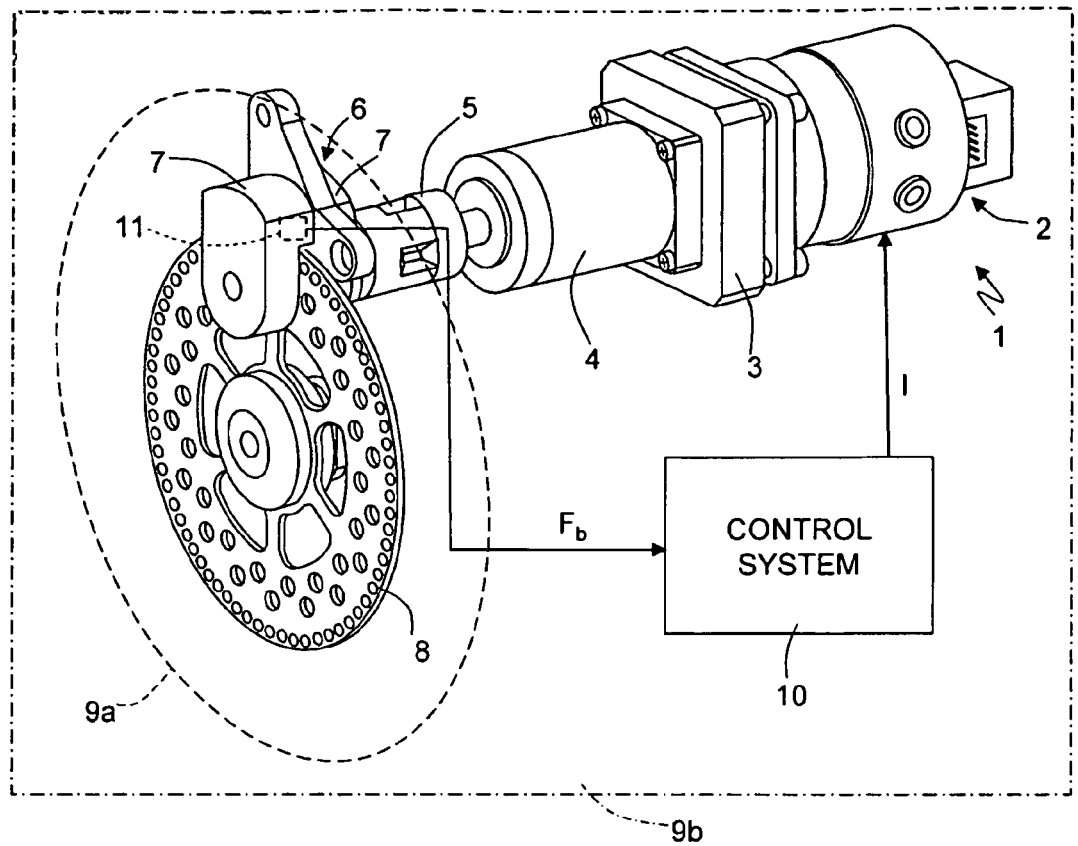
FIG. 1 is a schematic illustration of an electromechanical-braking system for use in a motor vehicle.

As illustrated schematically in FIG. 1, an electromechanical-braking system 1, in particular of the floating-disk type, generally comprises: an electric motor 2, for example of a brushless type; a planetary reduction gear 3, connected to the output of the electric motor 2; a ballscrew 4, connected to the output shaft of the planetary reduction gear 3; a piston 5, actuated by the ballscrew 4; a brake calliper 6, on which the piston 5 impinges, and comprising two brake pads 7 (one internal and the other external with respect to a brake disk); a brake disk 8 associated with the brake calliper 6; and an outer body (not illustrated), fixed with respect to which are the electric motor 2 and one of the brake pads 7, in particular the one outside the brake disk 8. The brake disk 8 is moreover fixed to a wheel 9a of a motor vehicle 9b in such a way as to stop rotation thereof.

The electromechanical-braking system 1 further comprises a control system 10, designed to control its operation. In particular, this operation, as in the case of traditional braking systems, envisages movement of the piston 5 via a force parallel to its axis so that the piston acts on the brake pads 7, exerting the braking force on the brake disk 8. However, whereas in traditional systems the aforesaid force is generated by means of a hydraulic system, in this case it is produced via the electric motor 2 and transmitted to the piston 5 by means of appropriate transmission members (planetary reduction gear 3 and ballscrew 4).

In greater detail, when a braking force is required, the control system 10 supplies the electric motor 2 via a current control signal I. The electric motor 2 thus generates a torque, which, through the transmission mechanism described, is down-shifted and converted into a linear force that moves the piston-pad assembly until it comes into contact with the brake disk 8. When the brake pads 7 contact the brake disk 8, on the basis of the braking force required by the driver (determined by means of purposely provided sensors detecting, e.g., the angle and speed of movement of the brake pedal), the piston 5 is further displaced, thus causing a deformation of the outer body. The reaction caused by this deformation enables the external pad to remain in contact with the brake disk and to actuate the brake. Once the braking request by the driver has stopped, the system returns into an initial rest position; the return is obtained in part mechanically thanks to the ballscrew 4. In fact, given that the screw is reversible, the piston 5 can be moved in a direction opposite to the one that brings it up to the brake disk 8, due to the reaction force of the outer body.

The control system 10 also receives, from sensors associated with the electromechanical-braking system 1, quantities corresponding to the braking action exerted by the electromechanical actuators so as to effect an appropriate closed-loop feedback control. In particular, a force sensor 11 is used for monitoring the braking action, configured to detect a braking force $F_b$ generated by the piston 5 on the brake disk 8. Typically, the force sensor 11 comprises a load cell set between the piston 5 and the pad internal with respect to the brake disk.

According to an embodiment of the present invention, the control system 10 implements a self-adaptive model-based predictive control. The features that, taken together or individually, distinguish the control system and that will be described in detail in what follows are: use of a model for parametric identification of the electromechanical-braking system 1; use of a generalized predictive control based on the parameters identified by the identification model; and implementation of an off-line control (or "tuning") of "endogenous" parameters of the control system, optimized in the context of the formulation of a genetic-programming problem, with the aid of multi-objective optimization techniques.

Figure 2:
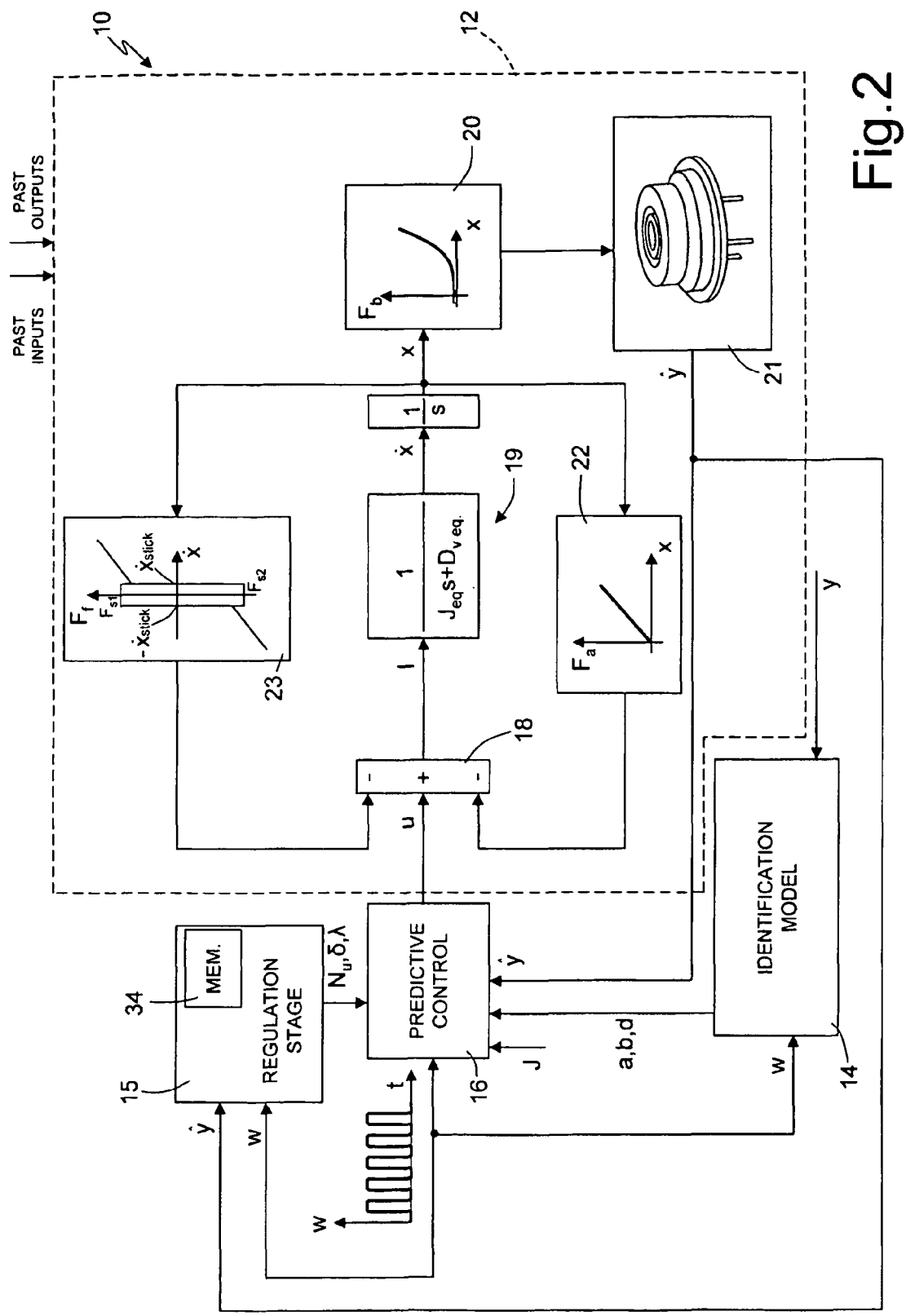
FIG. 2 is a block diagram of a control system of the electromechanical-braking system, according to an embodiment of the present invention.

In detail, and as illustrated in FIG. 2, the control system 10 comprises: braking-system modelling stage 12, configured to receive a control signal u (representing the future value, generated by the control system, of the current control signal I supplied to the electric motor 2) and the values of the past inputs and outputs of the control system, and to supply an estimated output signal ŷ representing the response of the braking system to the control signal u (in particular, representing the braking force $F_b$ exerted by the piston 5 on the brake disk 8); a system-identification-model stage 14, receiving a braking reference signal w applied at the input of the electromechanical-braking system 1, and a real output signal y representing the real braking action of the electromechanical-braking system 1 in response to the input signal (in particular, as detected by the force sensor 11), and configured to identify the characteristic parameters of a transfer-function model of the braking system; a regulation stage 15 receiving at input the braking reference signal w, indicating a target braking action for the control system (in particular, representing a reference current $I_{ref}$ for the electric motor 2) and the estimated output signal ŷ, and configured to identify endogenous parameters of the control system; and a self-adaptive control stage 16, which is connected at input to the system-identification-model stage 14 for receiving the identifying parameters, to the regulation stage 15 for receiving the endogenous parameters, and further receives at its input the reference signal w, the estimated output signal ŷ, and an objective function J, for supplying at its output the control signal u(t) indicating the future control action of the system.

In greater detail, the braking-system modelling stage 12 comprises: an input adder block 18 having a positive input receiving the control signal u, a first negative input, and a second negative input, and an output; an electromechanical-brake modelling block 19 connected to the output of the input adder block 18; a braking-force modelling block 20, connected to the output of the electromechanical-brake modelling block 19; a force-sensor modelling block 21, connected to the output of the braking-force modelling block 20 and supplying, to the output of the braking-system modelling stage 12, the estimated output signal ŷ; a calliper modelling block 22, connected at its input to the output of the electromechanical-brake modelling block 19, and at its output to the first negative input of the input adder block 18; and a friction-modelling block 23, connected at its input to the output of the electromechanical-brake modelling block 19, and at its output to the second negative input of the input adder block 18.

Figure 3:
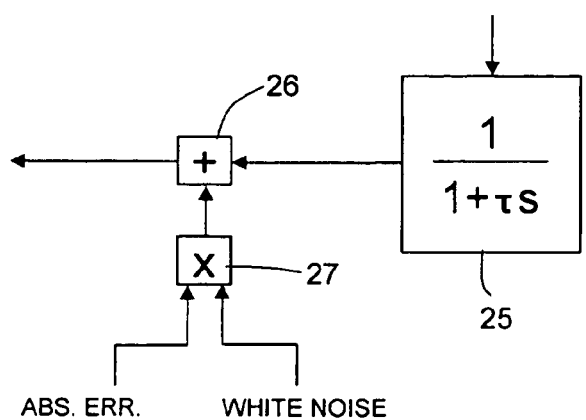
FIG. 3 is a block diagram of a model of force sensor implemented in a braking-system modelling stage.

With reference to FIG. 3, in the force-sensor modelling block 21, the force sensor 11 is modelled as a first-order system (transfer block 25), with transfer function 1/(1+τs). To the output of the transfer block 25 there is added (adder block 26) the intrinsic error of sensitivity associated with the measurement, given by the product (product block 27) of a white noise and the absolute error of the sensor. The output of the adder block 26 is also the output of the force-sensor modelling block 21.

In particular, the accuracy of the sensor is the full-scale percentage relative error, i.e.:

$$\text{accuracy} = \frac{\text{absolute\_error}}{\text{max\_force\_detected}} \cdot 100$$

For example, a force sensor with an accuracy of 0.02% and a maximum measured force of 22250 N (full scale) provides an absolute error of approximately 4.45 N. As regards the dynamic characteristics of the force sensor 11, to obtain the time constant τ it is assumed that the natural frequency $f_N$ of the sensor is equal to 4.5 kHz and that the corresponding settling time $\tau_a$ is approximately 4 to 5 times the time constant τ, whence it is found that $$\tau = \frac{\tau_a}{(4 \text{ to } 5)} = \frac{1}{(4 \text{ to } 5)f_N} \approx 4.831 \cdot 10^{-5} s$$

As regards modelling of the brake calliper 6 (calliper modelling block 22), the assembly formed by the brake pads 7, the brake disk 8, and the outer body of the brake, and the reaction force $F_r$ induced by the deformation of the brake callipers 6 due to the braking action of the piston 5 are considered. To a first approximation, and neglecting any possible nonlinearity, the link between the displacement of the piston x and the reaction force $F_r$ is modelled with a linear law (compression of a spring), as follows:

$$F_r = \begin{cases} 0 & x \leq 0 \\ -kx & x > 0 \end{cases}$$

where x is the position of the piston 5 along an axis of linear movement with origin in the point of contact between the piston 5 and the brake disk 8, in the absence of compression, and k is the coefficient of elasticity, which depends, in a known way, on the temperature (for this reason, a temperature sensor can possibly be provided in the braking system, for updating this coefficient).

Figure 4:
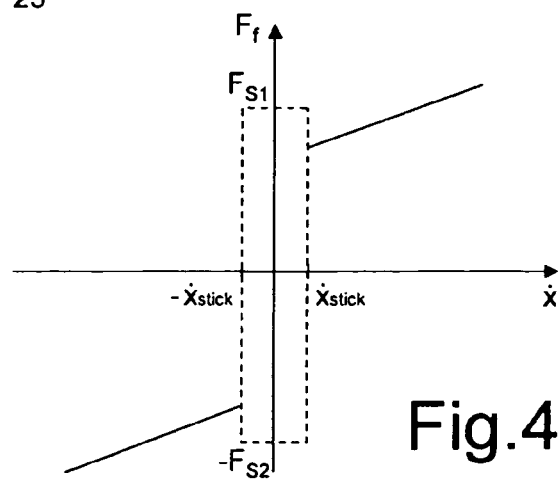
FIG. 4 shows a graph of a Karnopp asymmetrical static-friction model that may be used in the modelling stage.

In the friction-modelling block 23, to describe the friction phenomena that arise at the moment of braking between the pads 7 and the brake disk 8, a Karnopp asymmetrical-static-friction model is considered. The dependence between the force of friction, designated by $F_f$, and the speed of the piston 5, designated by ẋ, is schematically represented as illustrated in FIG. 4. In the region indicated by the dashed square, known as "stick region", there does not exist a linear dependence between the speed of the piston $\dot{x}$ and the force of friction $F_f$. In this region, the force of friction $F_f$ varies between a minimum $(-F_{S2})$ and a maximum $(F_{S1})$ that do not usually coincide on account of a lack of symmetry of the force of friction, due both to the impossibility of establishing precisely the value of zero-crossing of the speed of the piston, and to memory events that inevitably arise at low speeds ("stick-slip" effect, which causes a jerky advance), and to the non-reversibility of the dependence of the force of friction with respect to the two opposite directions of movement of the piston 5 (for example, on account of mechanical impediments). The dependence of the force of friction $F_f$ on the speed of the piston $\dot{x}$ can be summed up as follows:

$$F_f = \begin{cases} D_c \; \text{sign}(\dot{x}) + D_v \dot{x} & |\dot{x}| \geq \dot{x}_{stick} \\ F_{S1} & 0 \leq \dot{x} < \dot{x}_{stick}, |F| > F_{S1} \\ -F_{S2} & -\dot{x}_{stick} < \dot{x} < 0, |F| > F_{S1} \\ F & |\dot{x}| < \dot{x}_{stick}, |F| < \min(F_{S1}, F_{S2}) \end{cases}$$

where $D_c$ and $D_v$ are the coefficients of Coulomb friction and static friction, respectively, and $\dot{x}_{stick}$ is the limit, either negative or positive, of the aforesaid "stick region". When the speed of the piston $\dot{x}$ is low (within the stick region), the brake disk/piston system is nearly stationary, i.e., the two corresponding surfaces that are in contact, but for slight oscillations, do not move with an evident overall relative motion.

In the braking-force modelling block 20, the relation, of a nonlinear type, between the displacement x of the piston 5 and the braking force $F_b$ that is transferred to the brake disk 8, i.e., the force of compression of the piston on the disk, is considered. In particular, on the basis of experimental tests conducted on a prototype of electromechanical brake, the following parabolic relation is considered, which is valid for positive displacements of the piston $(x \geq 0)$:

$$F_b = 1.25 \cdot 10^4 \cdot x^2 + 2 \cdot 10^3 \cdot x$$

In the electromechanical-brake modelling block 19, the use of an electric motor 2 of a brushless type is first of all considered. In particular, given that the dominant dynamics of the braking system occur at frequencies lower than the typical operating frequencies of a brushless motor, the electric motor 2 resembles a simple current-torque converter, so that the torque $T_m$ generated is given by:

$$T_m = K_e I$$

where I is the current driving signal of the electric motor, and $K_e$ [Nm/A] is a coefficient that sums up the electromechanical characteristics of the brushless motor.

Furthermore, from a modelling standpoint, the entire servo mechanism of transmission of motion (electric motor 2, planetary reduction gear 3, ballscrew 4, and piston 5), given that the dominant frequencies that describe operation of the braking system are low (of the order of a few hertz), is represented as a perfectly rigid transmission mechanism. In other words, it is the transmission ratio n that fully identifies the transmission of the servo mechanism:

$$n = \frac{\Delta q}{\Delta x} \left[ \frac{\text{rad}}{\text{m}} \right]$$

where $\Delta q$ and $\Delta x$ designate, respectively, the angle described by the electric motor 2 and the corresponding linear displacement of the piston 5. For the transmission ratio n a value of approximately $6\pi$ rad/mm was experimentally chosen.

As regards the electric motor, the equation of mechanical equilibrium can be expressed as $$T_m - T_{m\_eff} = J_m \cdot \ddot{q}_m + D_{c\_m} \cdot \text{sign}(\dot{q}_m) + D_{v\_m} \cdot \dot{q}_m$$

where $T_m$ and $T_{m\_eff}$ are, respectively, the torque of the electric motor 2 and the torque effectively available downstream of the gear reduction mechanism, $J_m \cdot \ddot{q}_m$ is the torque of inertia, whilst the expression $D_{c\_m} \cdot \text{sign}(\dot{q}_m) + D_{v\_m} \cdot \dot{q}_m$ represents the dissipative torque generated by friction.

The equation of mechanical equilibrium at the calliper side can instead be expressed as $$F_d = \begin{cases} J_c \cdot \ddot{x} + D_{v\_c} \cdot \dot{x} + D_{c\_c} \cdot \text{sign}(\dot{x}) & x \leq 0 \\ J_c \cdot \ddot{x} + D_{v\_c} \cdot \dot{x} + D_{c\_c} \cdot \text{sign}(\dot{x}) + k \cdot x & x > 0 \end{cases}$$

where $F_d$ is the braking force available at output from the transmission member, $J_c \cdot \ddot{x}$ is the force of inertia, whilst $D_{v\_c} \cdot \dot{x} + D_{c\_c} \cdot \text{sign}(\dot{x})$ is the dissipative force generated by friction, and $k \cdot x$ represents, as described previously, the reaction force $F_r$ of the brake calliper 6. The two foregoing equations of mechanical equilibrium are linked by the transmission ratio n; in particular we have:

$$q_m = x \cdot n$$

$$T_{m\_eff} = \frac{F_d}{n}$$

Substituting the aforesaid relations, we find:

$$T_m = \frac{F_d}{n} + n \cdot J_m \cdot \ddot{x}_m + n \cdot D_{c\_m} \cdot \text{sign}(\dot{x}_m) + n \cdot D_{v\_m} \cdot \dot{x}_m$$

Substituting, in the latter relation, the expression of the mechanical equilibrium for the calliper, we obtain:

$$\begin{cases} T_m = \left(\frac{J_c}{n} + n \cdot J_m\right) \cdot \ddot{x} + \left(\frac{D_{v\_c}}{n} + n \cdot D_{v\_m}\right) \cdot \dot{x} + \\ \left(\frac{D_{c\_c}}{n} + n \cdot D_{c\_m}\right) \cdot \text{sign}(\dot{x}) \\ x \leq 0 \\ T_m = \left(\frac{J_c}{n} + n \cdot J_m\right) \cdot \ddot{x} + \left(\frac{D_{v\_c}}{n} + n \cdot D_{v\_m}\right) \cdot \dot{x} + \\ \left(\frac{D_{c\_c}}{n} + n \cdot D_{c\_m}\right) \cdot \text{sign}(\dot{x}) + \frac{k}{n} \cdot x \\ x > 0 \end{cases}$$

Exploiting now the relation $T_m = K_e \cdot I$, and dividing each member by the coefficient $K_e$, we arrive at the final form of the equations regulating operation of the electromechanical brake:

$$\begin{cases} I = J_{eq} \cdot \ddot{x} + D_{v\_eq} \cdot \dot{x} + D_{c\_eq} \cdot \text{sign}(\dot{x}) & x \leq 0 \\ I = J_{eq} \cdot \ddot{x} + D_{v\_eq} \cdot \dot{x} + D_{c\_eq} \cdot \text{sign}(\dot{x}) + k_{eq} x & x > 0 \end{cases}$$

where the following equivalent parameters have been defined:

$$J_{eq} = \frac{\left(\frac{J_c}{n} + n \cdot J_m\right)}{K_e} \qquad D_{v\_eq} = \frac{\left(\frac{D_{v\_c}}{n} + n \cdot D_{v\_m}\right)}{K_e}$$

$$D_{c\_eq} = \frac{\left(\frac{D_{c\_c}}{n} + n \cdot D_{c\_m}\right)}{K_e} \qquad k_{eq} = \frac{k}{n \cdot K_e}$$

The above equations point out a nonlinearity of the electromechanical-braking system 1 due to the reaction force of the brake calliper 6, which is zero when the piston 5 is not in contact with the brake disk 8, and linear with the displacement of the piston 5 when contact with the brake disk 8 occurs. It should be noted that in FIG. 2 the transfer-function model of the electromechanical brake in the electromechanical-brake modelling stage 19 is directly derived from the equations described. The values of the equivalent parameters $J_{eq}$, $D_{c\_eq}$, $D_{v\_eq}$ and $k_{eq}$ were fixed choosing a cut-off frequency of the braking system not higher than 10 Hz and comparing the results of the response to input current steps with corresponding experimental data. In particular, the following values were considered:

$J_{eq}$=0.03[A·s²/mm] $D_{v\_eq}$=1[A·s/mm]

$D_{c\_eq}$=0.1[A·s/mm] $k_{eq}$=8[A/mm]

A discretization step $T_s$ of 0.005 s was chosen, given that it was experimentally found that smaller values of the discretization step can bring some blocks of the system to the margins of the stability region.

Figure 5A:
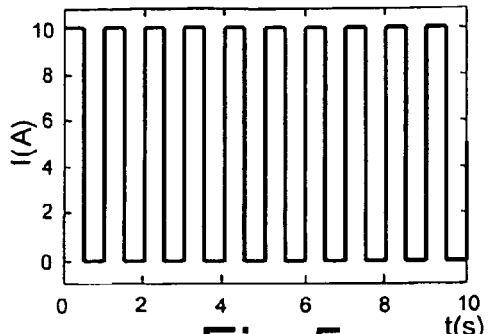
FIGS. 5a-5d show the plot of quantities of the modelling stage, in response to a pulse-train stimulus.
Figure 5B:
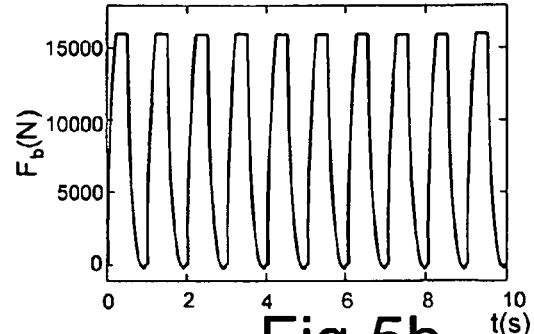
Figure 5C:
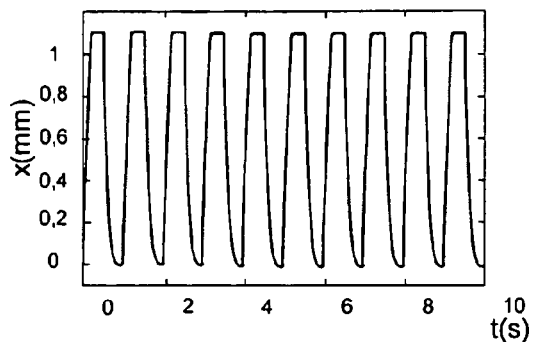
Figure 5D:
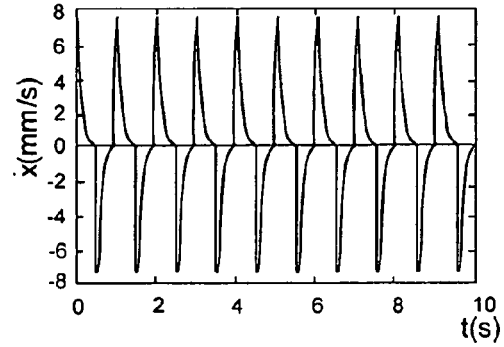

Various simulations were made in order to compare operation of the electromechanical-brake model described above with experimental results; in particular, the model was stimulated with a pulse-train current driving signal I (FIGS. 5a-5d) (representing a braking of an ABS type), with a frequency of 1 Hz, a duty cycle of 50%, and an amplitude of 10 A. It may be noted that in the rising phase of each pulse, the speed of the piston ẋ (FIG. 5d) increases rapidly until the piston 5 comes into contact with the brake disk 8. Then, the speed decreases even though the braking force $F_b$ exerted on the brake disk 8 remains maximum. In the descending phase of the current pulse, the torque supplied by the brake vanishes rapidly. The brake calliper 6, previously compressed by the piston 5, returns into a rest position, pushing the piston 5 backwards until it returns into the position of non-contact with the brake disk 8 (x=0).

The structure and operation of the system-identification-model stage 14 is now described, according to an embodiment of the control system of the present invention. The model is configured to provide a parametric identification of the electromechanical-braking system 1, in particular for reacting to structural changes (for example, due to wear or ageing) of system components. The system identification model uses a parametric identification technique of an ARMAX (AutoRegressive Moving Average exogeneous) type based on a first-order discrete-time system transfer-function model with delay.

Figure 6:
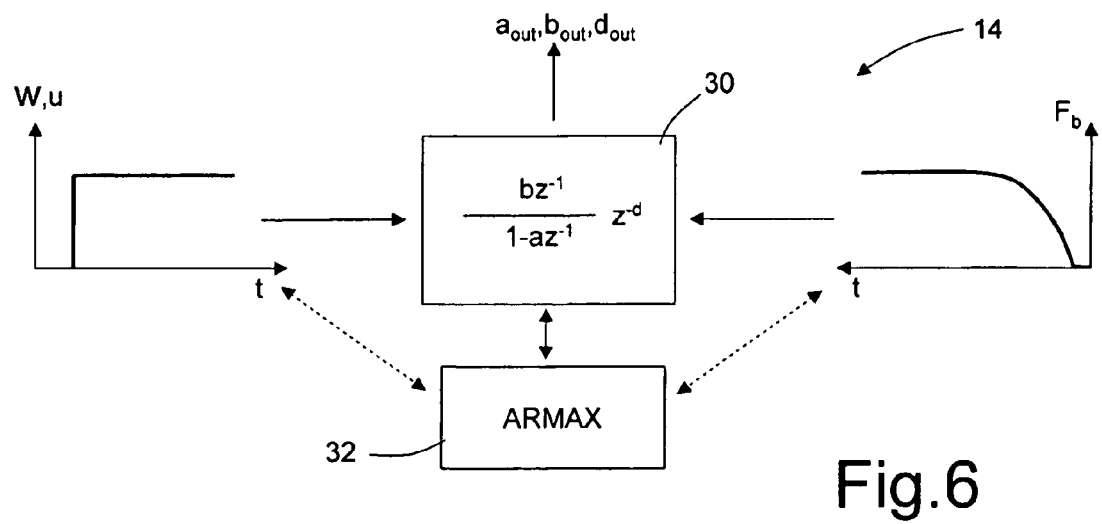
FIG. 6 is a block diagram of an identification model used in the control system of FIG. 2.

In detail, and as illustrated in FIG. 6, the system-identification-model stage 14 comprises a transfer-function block 30, which implements a first-order discrete-time transfer function G(z) with delay, of the type:

$$G(z) = \frac{bz^{-1}}{1 - az^{-1}} z^{-d}$$

a, b, d being the parameters identifying the system that are to be determined (in particular, d being the intrinsic delay of the system in response to an external stimulus). The transfer-function block 30 receives the reference signal w, for example a step signal, which is applied to the electromechanical-braking system 1, and the real output signal y(t). In practice, the real output signal y(t) is in this case the open-loop response of the electromechanical-braking system 1 to the reference input signal (coinciding in this case with the control signal u, which will therefore be used in the subsequent expressions). The system-identification-model stage 14 further comprises a processing block 32, configured to execute an ARMAX procedure on the basis of the transfer function G(z) for identification of the aforesaid identifying parameters.

In detail, the difference equation that describes the input-to-output relation of the system described by the transfer function G(z) is the following:

$$y(t) - a \cdot y(t-1) = b \cdot u(t-d-1)$$

Applying this equation to the N [$t_1, t_2, \ldots t_N$] samples of the control signal u(t) and of the corresponding output signal y(t), we obtain $$\begin{cases} y(t_1) = a \cdot y(t_1 - 1) + b \cdot u(t_1 - d - 1) = q_1^T \cdot p \\ \ldots \\ y(t_i) = a \cdot y(t_i - 1) + b \cdot u(t_i - d - 1) = q_i^T \cdot p \iff Y = Q \cdot p \\ \ldots \\ y(t_n) = a \cdot y(t_n - 1) + b \cdot u(t_n - d - 1) = q_n^T \cdot p \end{cases}$$

where p=[a,b] is the vector of the identifying parameters to be determined by solving the preceding system (in practice, d systems are solved, each corresponding to a different value of the parameter d, the system that supplies the lowest value of the residue identifying the values of the parameters a, b and d), and Q is the so-called matrix of the coefficients. The ARMAX procedure consists in solving the system through the least-squares method, i.e., minimizing the norm ∥Qp−Y∥. The so-called solution in the weak sense of the system (designated by p̂) is found by calculating the pseudo-inverse of the matrix of the coefficients Q, namely, $$\hat{p} = Q^T \cdot (Q^T \cdot Q)^{-1} \cdot Y$$

Advantageously, the determination at given intervals (which can be set beforehand, or during the control procedure) of the system identifying parameters enables effective modelling of the response of the system, even when structural changes are induced, for example, by the wear of some components, by ageing, by operation in particular temperature conditions, etc. Possibly, the determination can be made at each sampling step of the control system.

As mentioned previously, a further embodiment of the present invention envisages the use, in the self-adaptive control stage 16, of a model-based predictive control (MPC) technique, in particular a generalized predictive control (GPC) technique.

In a known way, the basic idea of an MPC is that of performing an action of control that will minimize the error that the system commits in a future time horizon with respect to the reference signal on which it is intended to force operation of the system. In general, the steps characterizing this control strategy are:

processing of a model of the system to predict the output of the system in a future time horizon;

calculation of the control/actuation sequence capable of minimizing an objective function that takes into account the error on the future reference and the energy expended for the actuation step; and use of a control strategy with receding horizon, in which only the first element of the control/actuation sequence determined at each step by the control system is effectively implemented, and at each sampling instant the calculation of the actuation sequence is repeated.

In detail, the control action at instant (t+k) (control signal u(t+k|t) supplied to the braking-system modelling stage 12) is determined by the self-adaptive control stage 16 on the basis of future errors (given by the difference between the estimated outputs and the reference signal) and via minimization of an objective function J that takes into account simultaneously the effort of actuation/control and the error in the future time horizon on the future reference signal. In detail, the objective function (also referred to as "cost function") J is a quadratic function of the type:

$$J(N_1, N_2 N_u) = \sum_{j=N_1}^{N_2} \delta(j) \cdot [\hat{y}(t+k|t) - w(t+j)]^2 + \sum_{j=1}^{N_u} \lambda(j) \cdot [\Delta u(t+j-1)]^2$$

where $\hat{y}(t+k|t)$ is the estimated output signal at instant (t+k) predicted by the model at instant t; w(t+j) is the reference signal at which operation of the system is to be forced; $\Delta$ is the discrete-time operator $1+z^{-1}$; $[N_1,N_2]$ is the prediction horizon, usually $N_1=d+1$ and $N_2=d+N_u$, where $N_u$ is the control horizon; $\lambda(j)$ is a first weight coefficient given to the square of the difference between the control predicted at instant (t+j−1) and the one at instant (t+j−2); $\delta(j)$ is a second weight coefficient that is given in the objective function to the prediction of the square of the tracking error at time (t+j); and the factor d is the intrinsic delay of the system in response to an external stimulus.

In general, the real system to be controlled can be described by an input/output model of a CARIMA (Controller Auto-Regressive Integrated Moving Average) type, of the sort:

$$A(z^{-1}) \cdot y(t) = z^{-d} \cdot B(z^{-1}) \cdot u(t-1) + C(z^{-1}) \cdot n(t)$$

where $A(z^{-1})$, $B(z^{-1})$, $C(z^{-1})$ are three polynomials in $z^{-1}$, respectively of degree $n_a$, $n_b$, $n_c$, $z^{-d}$ models an intrinsic delay of the system equal to d sampling instants, and n(t) is the noise of the model.

In particular, in the system-identification-model stage 14, a first-order model is considered for the transfer function of the system, so that $C(z^{-1})=1$ and the model noise is described as a white noise e(t).

Consequently, the foregoing general expression assumes the recursive form:

$$(1 - a \cdot z^{-1}) \cdot y(t) = b \cdot z^{-d} \cdot u(t-1) + \frac{e(t)}{\Delta}$$

Considering the expression of the objective function J previously identified and exploiting the foregoing recursive relation, it is possible to derive the outputs of the system predicted by the model, as $$\hat{y}(t+d+i|t) = (1+a) \cdot \hat{y}(t+d+i-1|t) - a \cdot \hat{y}(t+d+i-2|t) + b \cdot \Delta u(t+i-1) \quad i=1,\ldots,N_u$$

i.e., in the form of a system of equations:

$$\begin{cases} \hat{y}(t+d+1|t) = (1+a) \cdot \hat{y}(t+d|t) - a \cdot \hat{y}(t+d-1|t) + b \cdot \Delta u(t) \\ \hat{y}(t+d+2|t) = (1+a) \cdot \hat{y}(t+d+1|t) - a \cdot \hat{y}(t+d|t) + b \cdot \Delta u(t+1) \\ \ldots \\ \hat{y}(t+d+N_u-1|t) = (1+a) \cdot \hat{y}(t+d+N_u-2|t) - a \cdot \hat{y}(t+d+N_u-3|t) + b \cdot \Delta u(t+N_u-2) \\ \hat{y}(t+d+N_u|t) = (1+a) \cdot \hat{y}(t+d+N_u-1|t) - a \cdot \hat{y}(t+d+N_u-2|t) + b \cdot \Delta u(t+N_u-1) \end{cases}$$

and in matrix form:

$$\hat{Y}_{(d+1,\ldots,d+N_u)} = A \cdot U + B$$

where:

$A = C(:, 3:N_u+1)$ $B = C(:, 1:2) \cdot (\hat{y}(t+d), \hat{y}(t+d-1))^T$ $U = (\Delta u(t), \Delta u(t+1), \ldots, \Delta u(t+N_u-2), \Delta u(t+N_u-1))^T$ $$C = \begin{pmatrix} (1+a) & -a & b & 0 & \ldots & \ldots & 0 \\ (1+a)^2 & [-a(1+a)-a] & b(1+a) & b & 0 & \ldots & 0 \\ \ldots & \ldots & \ldots & \ldots & \ldots & \ldots & \ldots \\ \ldots & \ldots & \ldots & \ldots & \ldots & \ldots & \ldots \\ \ldots & \ldots & \ldots & \ldots & \ldots & \ldots & \ldots \\ \ldots & \ldots & \ldots & \ldots & \ldots & \ldots & \ldots \end{pmatrix}$$

Furthermore, the rows of the matrix C, of size $N_u \times (N_u+1)$, can be constructed with the recursive formula:

$$\begin{cases} C(i, :) = (1+a) \cdot C(i-1, :) - a \cdot C(i-2, :) + b \cdot \varepsilon(1, 2+i) & i = 1, \ldots, (N_u-1) \\ C(N_u, :) = (1+a) \cdot C(N_u-1, :) - a \cdot C(N_u-2, :) + b \cdot \varepsilon(1, N_u+1) & i = N_u \end{cases}$$

Using matrix notation, the objective function J that is to be minimized can be expressed as $$J = \delta(\hat{Y}_{(d+1,\ldots,d+N_u)} - \Omega_{(d+1,\ldots,d+N_u)}) + \bar{\lambda} \cdot U \cdot U^T = \delta \cdot (A \cdot U + B)^* (A \cdot U + B)^T + \bar{\lambda} \cdot U \cdot U^T$$

where $\Omega_{(d+1,\ldots,d+N_u)}$ is the vector that describes the reference signal of the system in the prediction horizon. Assuming that the weight coefficients $\delta(i)$, $\lambda(i)$ have the same value for each value of the summation index, the control vector of the system (comprising the control signals u(t) at the various future instants) minimizing the cost index is given by the following expression:

$$U = -\delta^{-1} \cdot (A^T \cdot A + \lambda \cdot I)^{-1} * A^T \cdot \tilde{B}$$

where:

$$\tilde{B} = (B - \Omega_{(d+1, \ldots, d+N_u)})$$

The aforesaid expression represents the control/actuation vector identified through minimization of the objective function J. The self-adaptive control stage 16 implements a strategy with receding horizon so that only the first element of the control vector U is effectively used for control. Basically, at each step of the simulation, the calculation of the control vector U is repeated, and only the first element of this vector is selected. The computational cost of this control strategy can be accounted for by the matrix product described by the preceding expression. Generally, until the system-identification-model stage 14 detects a significant structural change of the electromechanical-braking system 1 (which is reflected in a variation of the identifying parameters a, b, d in the transfer-function model), advantageously, the calculation of the inverse of the matrix $(A^T \cdot A + \lambda \cdot I)$ is not repeated.

Figure 7A:
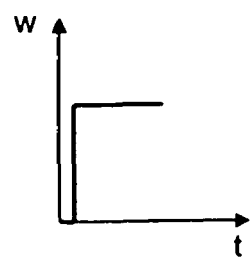
FIGS. 7a-7c show possible plots of a braking reference signal in a predictive control stage.
Figure 7B:
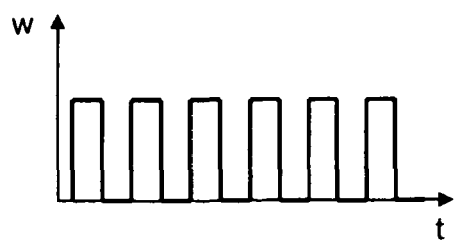
Figure 7C:
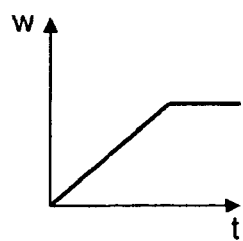
Figure 10A:
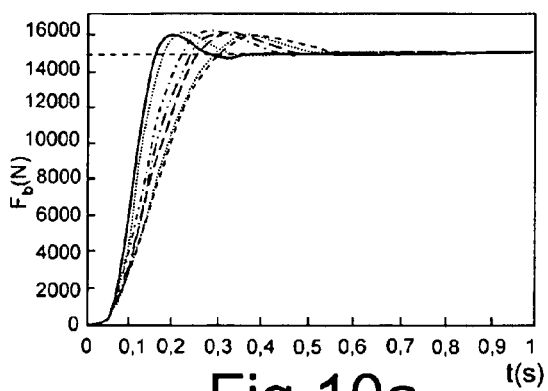
FIGS. 10a-10d show the plot of the closed-loop response of the control system to a step reference signal, in successive steps of the multi-objective optimization process.
Figure 10B:
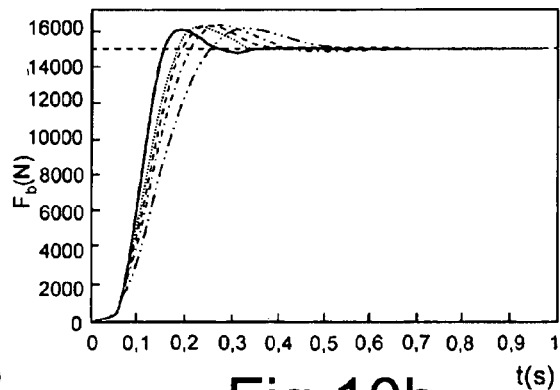
Figure 10C:
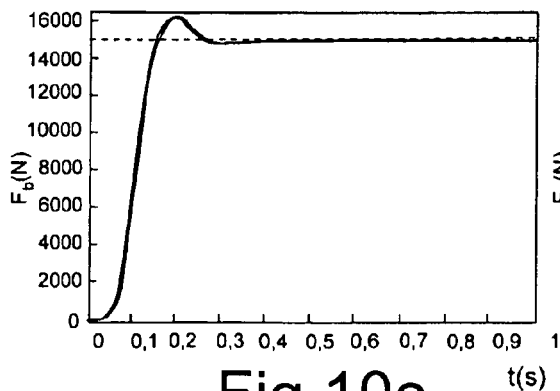
Figure 10D:
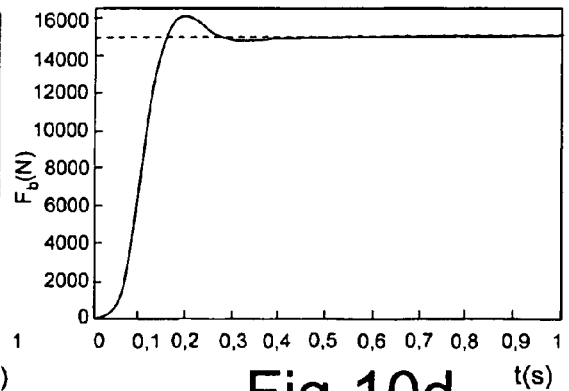

Furthermore, at each step of simulation, the reference vector $\Omega_{(d+1, \ldots, d+N_u)}$ of the system is updated. From a computational standpoint, said updating corresponds to a shift on memory registers containing the reference braking prototypes of the electromechanical-braking system. In this regard, and as illustrated in FIGS. 7a-7c, the reference signal w(t) used in the control strategy can assume at least three patterns, according to a braking mode imparted by the driver: a first, step pattern (FIG. 7a), corresponding to a sharp braking without intervention of the ABS; a second, pulse-train pattern (FIG. 10b), corresponding to a braking with intervention of the ABS; and a third pattern comprising an initial ramp portion (FIG. 10c), corresponding to a gradual braking.

In any case, the control vector U depends on a series of characteristic and intrinsic parameters of the control strategy (defined in what follows as "endogenous parameters"), and in particular on the weight coefficients $\delta(i)$, $\lambda(i)$ and the control horizon $N_u$. In practice, the relation $U(N_u, \delta, \lambda)$, or more precisely $U(N_2-N_1, N_u, \delta, \lambda)$, applies in the case where it is considered that the control horizon and prediction horizon of the outputs of the system do not have the same length, i.e., $(N_2-N_1) \neq N_u$.

In this regard, a further embodiment of the control system according to the present invention envisages a multi-objective optimization of the "endogenous" parameters upon which the control strategy depends, which is performed in the off-line regulation stage 15, i.e., in a step preliminary to the control operations.

In detail, the optimized regulation of the endogenous parameters initially envisages identification of the domain of variation of the identifying parameters a, b, d of the transfer function of the model in response to structural changes of the electromechanical-braking system 1. In order to identify this domain, the modality with which changes in some structural parameters of the braking system propagate on the values of the identifying parameters a, b, d is experimentally analyzed. For example, structural characteristics of the electromechanical-braking system 1 that could vary as the temperature and/or conditions of wear and/or ageing vary and induce a change in the identifying parameters are:

the numeric coefficients that describe the parabolic relation between the displacement of the piston 5 and the braking force $F_b$;

the values of the equivalent parameters $J_{eq}$, $D_{c\_eq}$, $D_{v\_eq}$ and $k_{eq}$ in the equations that regulate operation of the electromechanical brake;

the transmission ratio n; and the natural frequency $f_N$ and the full-scale error of the force sensor.

Figure 8:
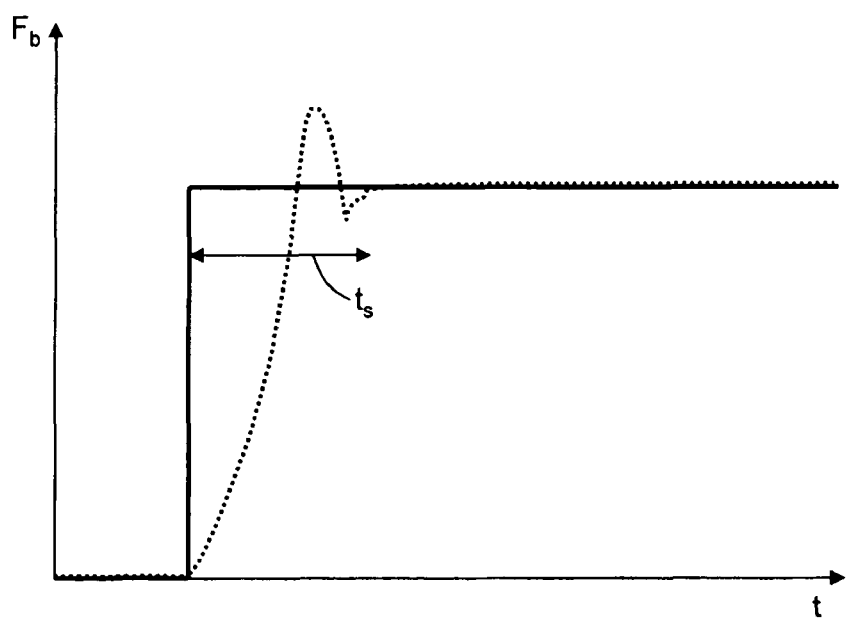
FIG. 8 shows a closed-loop response of the control system to a step reference signal.
Figure 9:
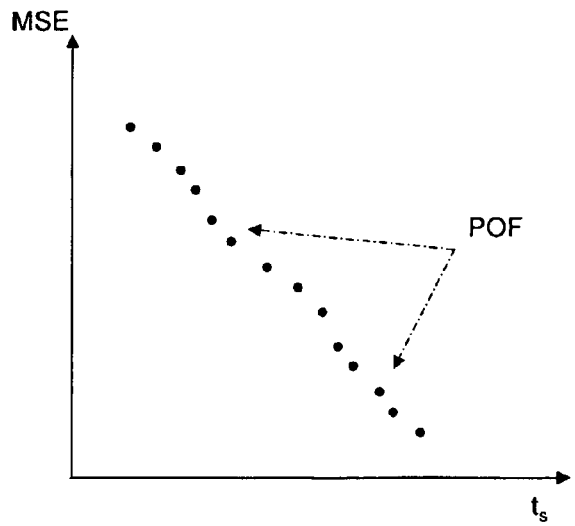
FIG. 9 shows a Pareto-Optimal-Front diagram associated with a multi-objective optimization process in the control system of FIG. 2.

Once the domain of variation of the identifying parameters a, b, d is determined, which is designated by $\phi(a, b, d)$, the optimal string of the endogenous parameters of the control action is determined (once again off-line) through the formulation of a problem of multi-objective optimization. In particular, the endogenous parameters $N_u$, $\delta$, $\lambda$ are considered as variables to be determined, and chosen as targets are the mean square error and the settling time $t_s$ (see FIG. 8), associated with the response of the closed-loop system (i.e., with the control system operating) to a step reference signal, over the entire domain of variation $\phi(a, b, d)$. As illustrated in FIG. 8, the settling time $t_s$ is the time after which the estimated output signal $\hat{y}$ (representing the braking force $F_b$) settles on the reference input signal. The result of the aforesaid multi-objective optimization is a set of possible optimal strings of the endogenous parameters of the self-adaptive controller, namely, $(N_u^{opt}, \delta^{opt}, \lambda^{opt})_i$ i=1, ..., $N_{POF}$, for all the possible values assumed by the identifying parameters in the range of their domain of variation. FIG. 9 illustrates a typical Pareto optimal front (POF), which is the result of the multi-objective optimization of the self-adaptive controller over the domain of variation $\phi(a, b, d)$ of the identifying parameters a, b, d. Each point of the Pareto optimal front represents a possible optimal string of endogenous parameters $(N_u^{opt}, \delta^{opt}, \lambda^{opt})_i$, which is valid for a particular value of the identifying parameters a, b, d.

Advantageously, within the regulation stage 15 a parameter memory 34 is envisaged (FIG. 2), in which the optimal strings of endogenous parameters $(N_u^{opt}, \delta^{opt}, \lambda^{opt})_i$ thus determined are stored. In this way, during the on-line control procedure, the system-identification-model stage 14 identifies the values of the identifying parameters a, b, d describing the electromechanical-braking system 1, in the regulation stage 15 the optimal string of the endogenous parameters corresponding to these values is thus recovered, and in the self-adaptive control stage 16 the identifying parameters and the endogenous parameters thus identified for the operations of predictive control are used (the controller having been in this way already optimized off-line, without the need for further on-line processing).

FIGS. 10a-10d show in sequence the evolution of the multi-objective optimization process in the step response of the control system. It is evident that the optimization process improves the response of the closed-loop system to a step reference signal of braking force, and in particular reduces both the settling time $t_s$ and the mean square error MSE.

The control system 10 was tested in a real situation, using a prototype of electromechanical-braking system.

In detail, from the parametric identification of the step response of the open-loop system, the following values for the identifying parameters of the transfer function (in nominal working conditions) were obtained:
a=0.9653
b=60.98
d=5

It was considered a domain of variation of the identifying parameters of the type:

$$\Phi(a,b,d) = [a_{min} = a-0.1a, \; a_{max} = a-0.02a] \cap$$

$$\cap [b_{min} = b-0.1b, \; b_{max} = b-0.1b] \cap [d_{min} = T_s, d_{max} = 10T_s]$$

where $T_s$ is the sampling step of the system.

Multi-objective optimization of the endogenous parameters of the controller was then performed to obtain a series of configurations of the self-adaptive controller making it robust against random variations, but in any case within the limits of the domain φ(a, b, d) of the transfer function identifying parameters.

Figure 11A:
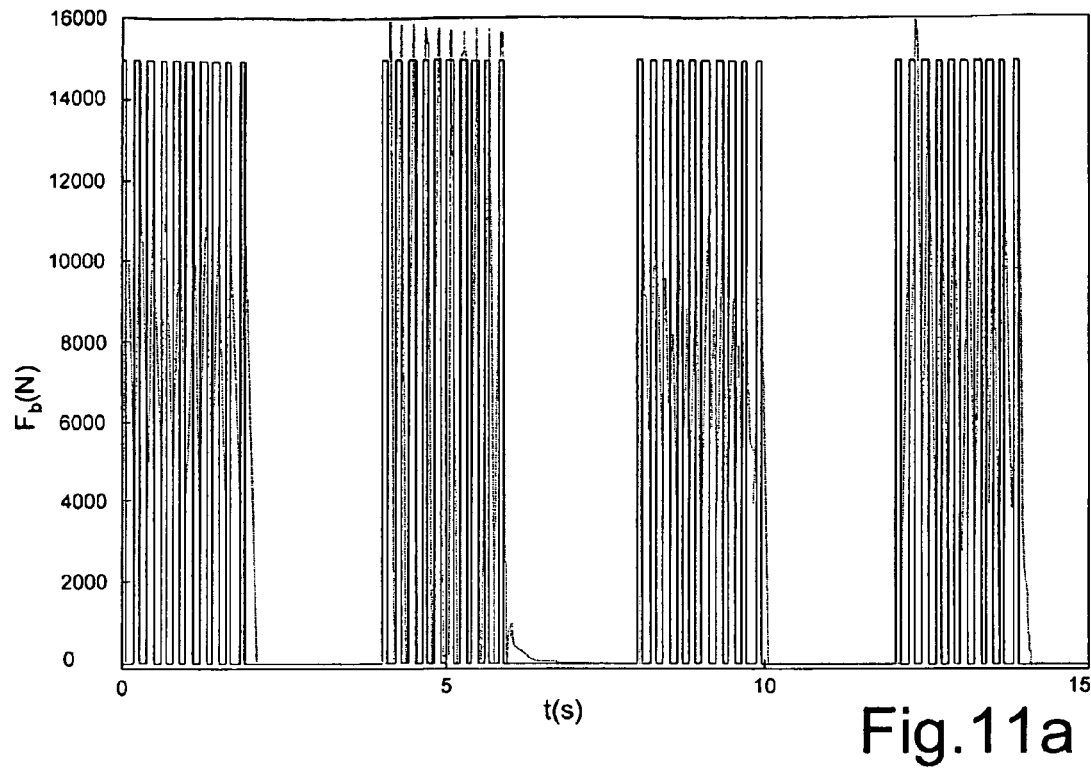
FIGS. 11a and 11b show the response to a reference signal representing an ABS braking of a traditional PID control system and of a control system according to an embodiment of the present invention, respectively.
Figure 11B:
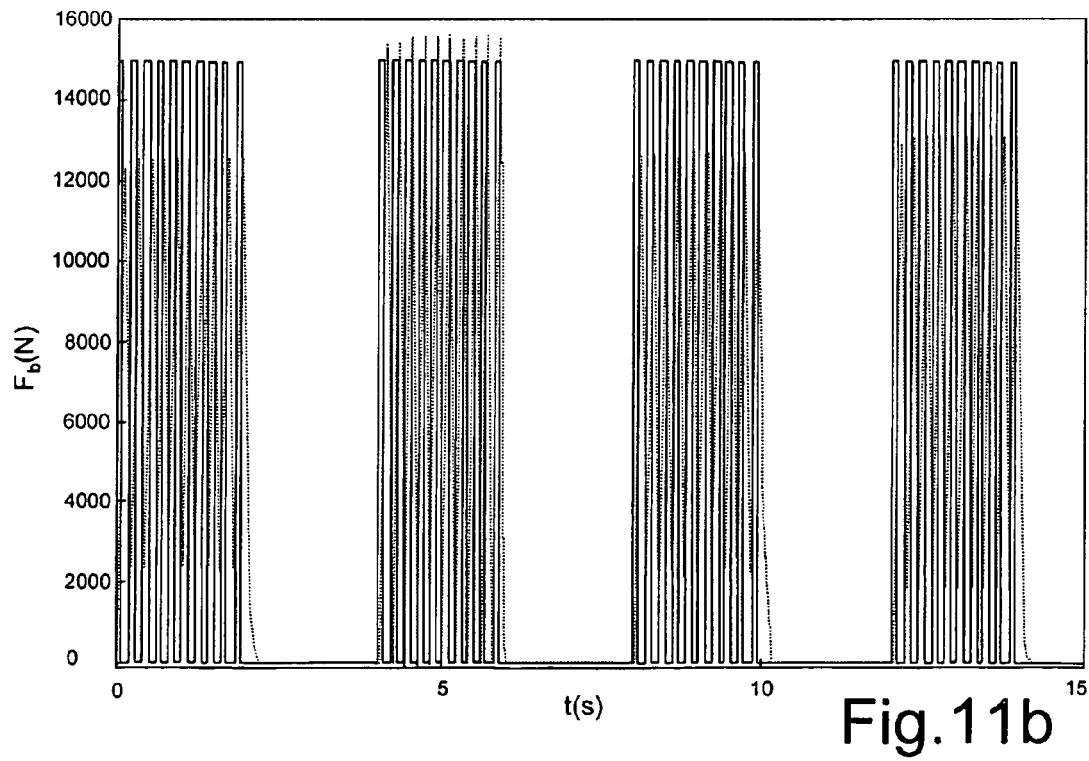

The performance of the controller was then compared with that of a PID controller of a traditional type, departing from the nominal conditions of operation. In particular, reference signals typical of an ABS were considered at a frequency of 5 Hz, repeated at intervals of two seconds, inducing at each repetition random variations in the domain φ(a, b, d) of the identifying parameters of the transfer function. From a comparison of the response of the system controlled using the PID controller (FIG. 11a, in which said response is illustrated superimposed on the reference signal) with that of the system controlled via the predictive control according to an embodiment of the present invention (FIG. 11b) there clearly emerges the degradation of the performance of the PID controller as the structural conditions of the system vary, and the capacity of the predictive controller for adapting to the changes induced, providing the required performance at each point of the domain of variation φ(a, b, d). In particular, in order to assess the effectiveness of an ABS braking action one verifies the extension of the induced braking force and the time of delay with respect to the reference pulse. By "extension of the braking force" is understood the range between the maximum force and the minimum force transferred at each braking pulse. The purpose of each ABS braking pulse is to transfer a maximum force as close as possible to that of the reference pulse (the so-called "sticking phase" or "wheel-locking phase") and a minimum force as close as possible to zero (the so-called "slipping phase" or "wheel-slipping phase"), coinciding with the physical event of detachment of the piston 5 from the brake disk 8. In particular, from a comparison between the aforesaid FIGS. 11a-11b, it is clear that the effectiveness of the braking action transferred by each pulse of the ABS braking pattern is greater when the electromechanical-braking system 1 is controlled by means of the predictive controller according to an embodiment of the invention.

From what has been described and illustrated herein, the advantages of the control system and control method according to an embodiment of the invention are evident.

In particular, the advantages are clear as compared to controllers of a traditional type, for example of a proportional-integral-derivative (PID) type or proportional-integral (PI) type. These strategies enable a good degree of precision in the short-term control, but are not robust against structural changes of the system, due for example to ageing, wear and malfunctioning of some components; instead, the predictive control system according to an embodiment of the invention enables robust results to be obtained against changes of the system, without compromising the effectiveness of the control action. Thanks to the parametric identification of the braking system, the control system has an intrinsic capacity for real-time self-adaptation to structural variations of the braking system. In fact, far from the nominal operation conditions of the braking system, whilst PID controllers show a clear deterioration in their performance, the predictive self-adaptive controller according to an embodiment of the invention still manages to ensure an effective control action.

Furthermore, off-line optimization of the endogenous parameters on which the control action depends enables a considerable computational saving during the on-line control operations. In particular, this optimization is performed making use of sophisticated multi-objective optimization techniques so as to identify not just one solution but a set of "optimal" solutions for the design of the self-adaptive controller. Once the identifying parameters of the transfer function have been determined, the values of the endogenous parameters and hence the structure of the predictive controller are automatically determined (without any further processing).

Furthermore, it is emphasized that the use of a predictive control system for the control of the electromechanical-braking system 1 is enabled by the prior knowledge of the reference braking signals that it is desired to obtain at output.

Finally, it is clear that modifications and variations can be made to what is described and illustrated herein, without thereby departing from the scope of the present invention.

In particular, in the self-adaptive control stage 16 other techniques of predictive control can be used, such as, for example, a dynamic matrix control (DMC), or a GPC with constraints; or else, in the braking-system modelling stage 12 different (more or less complex) models of the components and characteristics of the electromechanical-braking system 1 could be used.

The transfer function used for modelling the response of the system could be different from the one described; for example, it could have a higher order (with the consequence, however, of a higher computational cost).

Furthermore, different reference braking signals could be used, in addition to, or instead of, the ones described previously.

The braking force signal $F_b$ at the output of the model could be detected in a different way, without the use of a force sensor; for example, it could be determined indirectly as a function of the angle of rotation of the electric motor 2. In this connection, a sensor configured to measure the angular position of the rotor of the electric motor 2 (typically an encoder or a Hall-effect sensor) could be provided.

Finally, the quantity controlled by the control system representing the braking action (in the embodiment described, the braking force $F_b$) could be different. In fact, an estimation and/or a measurement of the braking torque $T_b$ could be used as controlled quantity, said braking torque $T_b$ being in general given by $T_b = m_u \cdot F_b$, where $m_u$ is the coefficient of friction between the pad and the brake disk. The braking torque $T_b$ could also be measured indirectly via an estimation of the deceleration of the vehicle in response to the braking action, measured, for example, with an accelerometer sensor (in any case, the control system described remaining substantially unvaried). Furthermore, an embodiment of the above-described control system may be used on a vehicle other than an automobile, or in any apparatus that employs braking.

A control method for controlling an electromechanical-braking system (1) provided with actuator means (2, 5) configured to actuate braking means (6, 8) for exerting a braking action, comprising the step of controlling said braking action on the basis of a braking reference signal (w), characterized in that said step of controlling comprises implementing a model-based predictive controller operating on the basis of a control quantity ($F_b$) representing said braking action.

The control method according to paragraph [78], wherein said step of controlling comprises implementing a generalized predictive self-adaptive controller (GPC).

The control method according to paragraphs [78] or [79], further comprising the step of processing a model of said electromechanical-braking system (1) supplying an estimated output signal (ŷ) representing said control quantity ($F_b$); and wherein said step of controlling comprises generating a control signal (u) for said braking action minimizing an objective function (J) indicating an error between said estimated output signal (ŷ) and said braking reference signal (w).

The control method according to paragraphs [79] or [80], wherein said step of implementing a generalized predictive self-adaptive controller (GPC) comprises implementing a control strategy with receding horizon.

The control method according to paragraphs [78]-[81], further comprising the step of determining parameters (a, b, d) identifying a transfer function (G(z)) of said electromechanical-braking system (1); said step of controlling being based on said identifying parameters.

The control method according to paragraph [82], wherein said step of determining identifying parameters comprises using a technique of parametric identification of an ARMAX type, based on a discrete-time first-order model with delay of said transfer function (G(z)).

The control method according to paragraph [82] or [83], wherein said step of controlling comprises generating a control signal (u) for said braking action minimizing an objective function (J) indicating an error between said estimated output signal (ŷ) and said braking reference signal (w), said control signal (u) being a function of endogenous parameters ($N_u$, $\delta$, $\lambda$) characteristic of said predictive control; further comprising the step of determining an optimal value of said endogenous parameters.

The control method according to paragraph [84], wherein said step of determining an optimal value comprises implementing a multi-objective optimization technique for determination of said optimal value of said endogenous parameters ($N_u$, $\delta$, $\lambda$) for a certain value of said identifying parameters (a, b, d); said step of controlling comprising using said optimal value when said identifying parameters assume said certain value.

The control method according to paragraph [85], wherein said step of determining an optimal value is performed off-line, i.e., in a time interval preceding said step of controlling.

The control method according to paragraph [85] or [86], wherein said step of determining an optimal value comprises determining a domain of variation φ(a, b, d) of said identifying parameters (a, b, d) in response to structural modifications in said electromechanical-braking system (1), and determining a set of optimal values of said endogenous parameters ($N_u$, $\delta$, $\lambda$) for the possible values that said identifying parameters can assume within said domain of variation.

The control method according to paragraphs [85]-[87], wherein said endogenous parameters ($N_u$, $\delta$, $\lambda$) comprise weight coefficients ($\delta$, $\lambda$) of said objective function (J) and a control horizon ($N_u$) of said predictive control, and said step of determining an optimal value comprises using as target a mean square error and a settling time ($t_s$) of a response of said control system to a step braking reference signal (w).

What is claimed is:

1. A control system for controlling an electromechanical-braking system, the system comprising:
    a model-identification stage configured to determine identifying parameters of a transfer function of the electromechanical-braking system;
    an actuator configured to actuate a brake for exerting a braking action,
    a control stage configured to generate a control signal to control said braking action on the basis of a braking reference signal, the identifying parameters and endogenous parameters of the electromechanical-braking system;
    a modelling stage for modelling the electromechanical-braking system, configured to supply an estimated output signal in response to a control signal generated by the control stage, the control block configured to minimize an objective function indicating an error between the estimated output signal and the braking reference signal, and
    a regulation stage configured to determine a domain of variation of the identifying parameters in response to structural modifications in the electromechanical-braking system, and including a multi-objective optimization block configured to determine a set of optimal values of the endogenous parameters for the possible values that the identifying parameters can assume within the domain of variation.

2. The control system according to claim 1, wherein said model-based predictive control block comprises a generalized predictive self-adaptive controller.

3. The control system according to claim 2, wherein said model-based predictive control block is configured to implement a control strategy with receding horizon.

4. The control system according to claim 1, wherein said braking reference signal represents a desired braking action, and has a pattern chosen between: a step pattern, a pulse-train pattern, and a ramp pattern.

5. The control system according to claim 1, wherein said model-identification stage is configured to implement a parametric identification technique of an ARMAX type, based on a discrete-time first-order model with delay of said transfer function.

6. The control system according to claim 1, wherein said model-based predictive control block is configured to generate a control signal for said braking action via minimization of an objective function indicating an error between said estimated output signal and said braking reference signal, said control signal being a function of endogenous parameters characteristic of said predictive control; said control system further comprising a regulation stage configured to determine an optimal value of said endogenous parameters.

7. The control system according to claim 6, wherein said regulation stage comprises a multi-objective optimization block for determination of said optimal value of said endogenous parameters for a certain value of said identifying parameters; said optimal value being used in said model-based predictive control block when said identifying parameters equal said certain value.

8. The control system according to claim 7, wherein said multi-objective optimization block is operative off-line, i.e., in a time interval in which said model-based predictive control block is not operative.

9. The control system according to claim 7, in which said regulation stage is configured to determine a domain of variation φ of said identifying parameters in response to structural modifications in said electromechanical-braking system, and to determine a set of optimal values of said endogenous parameters for the possible values that said identifying parameters can assume within said domain of variation.

10. The control system according to claim 7, wherein said endogenous parameters comprise weight coefficients of said objective function and a control horizon of said predictive control, and said multi-objective optimization block is configured to use as target a mean square error and a settling time of a response of said control system to a step braking reference signal.

11. The control system according to claim 9, wherein said regulation stage comprises a parameter memory configured to store said set of optimal values of said endogenous parameters, and said control stage is configured to recover from said parameter memory an optimal value of said endogenous parameters associated to the value of said identifying parameters determined by said model-identification stage.

12. A method, comprising:
    identifying parameters of a transfer function of an electromechanical-braking system;
    modelling the electromechanical-braking system and generating an estimated output signal that is a minimization of an objective function indicating an error between the estimated output signal and a braking input signal;
    determining a domain of variation of the parameters in response to structural modifications in the electromechanical-braking system including a multi-objective optimization of a set of optimal values of the endogenous parameters for the possible values that the parameters can assume within said domain of variation;
    generating, during operation of the braking system, a control signal in response to the retrieved endogenous parameter, a feedback signal from the braking system, and a braking input signal;
    coupling the control signal to the braking system; and
    actuating the braking system in response to the control signal.

13. The method of claim 12, further comprising generating the model of the braking system in response to the feedback signal and the braking input signal.

14. The method of claim 12, further comprising:
    generating a simulated version of the feedback signal in response to the control signal;
    changing the value of the parameter of the control system in response to the simulated version of the feedback signal.

15. The method of claim 12, further comprising changing the value of the parameter of the control system in response to the control signal.

16. The method of claim 12, further comprising changing the value of the parameter of the control system in response to braking input signal.

17. The method of claim 12, further comprising:
    generating a simulated version of the feedback signal in response to the control signal; and
    changing the value of the parameter of the control signal in response to a function of the simulated version of the feedback signal, the control signal, and the braking input signal.

18. The method of claim 12, further comprising:
    generating a simulated version of the feedback signal in response to the control signal; and
    changing the value of the parameter of the control signal to reduce a value of a function of the simulated version of the feedback signal, the control signal, and the braking input signal.

19. A system, comprising:
    a brake configured to receive a control signal and to generate a feedback signal; and
    a control circuit coupled to the brake, the control circuit comprising
        a model-identification stage configured to determine identifying parameters of a transfer function of the electromechanical-braking system;
        a control stage configured to generate a control signal to control said braking action on the basis of a braking reference signal, the identifying parameters and endogenous parameters of the electromechanical-braking system;
        a modelling stage for modelling the electromechanical-braking system, configured to supply an estimated output signal in response to a control signal generated by the control stage, the control block configured to minimize an objective function indicating an error between the estimated output signal and the braking reference signal, and
        a regulation stage configured to determine a domain of variation of the identifying parameters in response to structural modifications in the electromechanical-braking system, and including a multi-objective optimization block configured to determine a set of optimal values of the endogenous parameters for the possible values that the identifying parameters can assume within the domain of variation.

20. The system of claim 19, further comprising:
    a wheel operable to rotate; and
    wherein the brake is operable to slow the rotation of the wheel in response to the control signal.

21. The system of claim 19 wherein:
    the control circuit is disposed on a first integrated circuit; and
    a processor coupled to the control circuit and disposed on a second integrated circuit.

22. The system of claim 19 wherein:
    the control circuit is disposed on an integrated circuit; and
    a processor coupled to the control circuit and disposed on the integrated circuit.

23. The system of claim 19 wherein:
    the memory is operable to store multiple values for the parameter of the control algorithm; and
    the control circuit further comprises a regulator stage that is operable to select for the parameter of the control algorithm the stored value that corresponds to the value of the parameter of the model of the brake.

24. A control system for controlling an electromechanical braking, system, comprising:
    a model-identification stage configured to determine identifying parameters of a transfer function of the electromechanical-braking system;
    a control stage, implementing a model-based predictive control block configured to control a control quantity representing a braking force of a braking action; based on a braking reference signal, said identifying parameters and endogenous parameters characteristic of said predictive control, thereby generating a control signal for said braking action;
    a modeling stage for modeling said electromechanical-braking system, configured to supply an estimated output signal representing said control quantity in response to said control signal, said model-based predictive control block configured to minimize an objective function indicating an error between said estimated output signal and said braking reference signal; and
    a regulation stage configured to determine a domain of variation of said identifying parameters in response to structural modifications in said electromechanical-braking system, and including a multi-objective optimization block for determination of a set of optimal values of said endogenous parameters for the possible values that said identifying parameters can assume within said domain of variation; said optimal values being used in said model-based predictive control block when said identifying parameters assume said possible values.

* * * * *